Oct. 13, 1970          N. M. KERR          3,533,184
CLIP FOR CONNECTING A SNOOD TO A FISHING LINE
Filed June 21, 1968          2 Sheets-Sheet 1
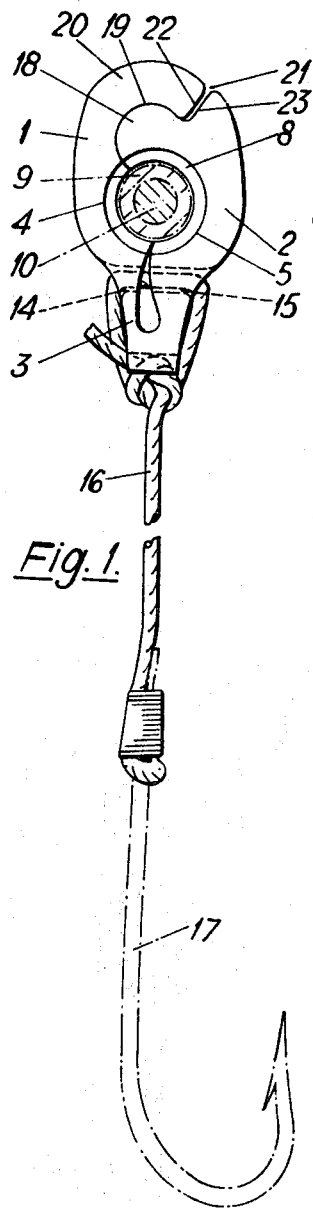
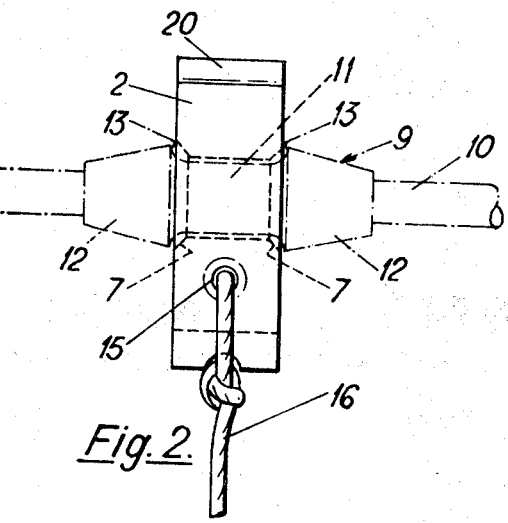
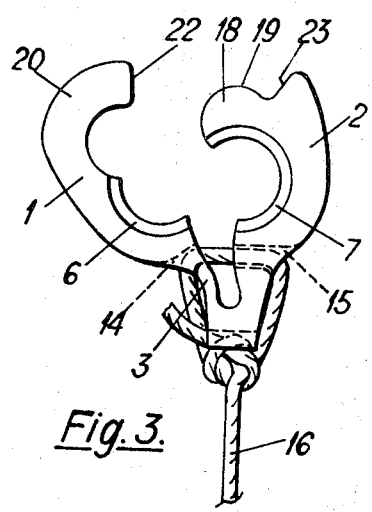
Inventor
NORMAN MITCHELL KERR
By Kurt Kelman
AGENT 3,533,184
CLIP FOR CONNECTING A SNOOD
TO A FISHING LINE
Norman Mitchell Kerr, Hull, England, assignor to National Research Development Corporation, London, England
Filed June 21, 1968, Ser. No. 738,925
Claims priority, application Great Britain, June 26, 1967, 29,395/67
Int. Cl. A01k 91/04
U.S. Cl. 43—44.84                                   9 Claims

ABSTRACT OF THE DISCLOSURE

A clip for detachably connecting a snood to a fishing line, comprising two hinged-together arms adapted to be snap-fastened around the line or the like. The clip is formed with a connector for the snood comprising aligned holes through the two arms adjacent the hinge through which one end of the snood is passed and secured to the clip. The clip is preferably made integrally from a plastic material.

---

This invention relates to a clip suitable for providing a detachable connection to rope or the like, for example, a cable, tube, line (for instance, longline or clothesline), or other elongate article, and particularly, but not exclusively, for use in the fishing industry to connect a snood to a main line.

In longline or greatline fishing as currently practiced, a length of line of considerable length has dangling from it at spaced intervals along its length short line sections or snoods. Each snood is knotted to the main line and its free end is hooked and baited. The laying or shooting of the main line and its recovery or hauling is complicated by the permanent attachment of the snoods to the main line. Consequently, there has been relatively little improvement in the traditional method of shooting and hauling the main line up to the present date.

In accordance with the present invention there is provided a clip suitable for providing a detachable connection to a rope or the like, such clip comprising two hinged-together arms adapted to be snap-fastened around the rope or the like.

Such a clip may be manually or automatically attached or detached from the rope or the like; thus, the shooting and hauling of a main line and snoods may be carried out automatically or semi-automatically.

Preferably, the two arms are so shaped as to provide between them a circular aperture when the clip is closed. Thus, the said clip may, for example, comprise a deformable split ring. The rope or the like passes through the aperture and the clip may—for example, in the case of a clip for fastening a snood to a main line—be fastened to the line by embracing a sleeve or bobbin attached to or molded on the main line; alternatively, the clip may be located between spaced knots on the main line.

Conveniently, the arrangement is such that the clip is, in its closed position, rotatable with respect to the rope or the like to which it is fastened.

The clip may be integrally made from a suitable plastics material, in which case the hinge is preferably provided by a slender portion of the plastic material.

The arms are suitably adapted to be snap-fastened together by having co-operating parts. Thus one part may be formed with a nose having a shouldered surface over which can be snapped an angular or other limb provided on the other arm.

Preferably, the clip is formed with a connector which may, for example, comprise a hole passing through the two arms adjacent the hinge and through which, for example, a snood line may be threaded. Alternatively, the two arms may be made of metal or plastic material and the hinge may then be formed by a pivot pin, either forming an eye with the clip body or provided at one or both ends with an eyelet to enable a snood, for example, to be fixed to it.

In order that the invention may be more readily understood, two embodiments of a clip in accordance therewith and suitable for fastening a snood to a main line will now be described by way of example and with reference to the accompanying drawings in which:

FIG. 1 is an end elevation showing a clip in accordance with a preferred embodiment of the invention in its snap-fastened position about a bobbin (shown in section) carried by a main line and with a snood attached;

FIG. 2 is a side elevation of the embodiment of the clip shown in FIG. 1 and showing the bobbin and main line in dot and dash lines;

FIG. 3 is an end elevation of the clip of FIG. 1 showing the clip in its unfastened position.

Figure 4:
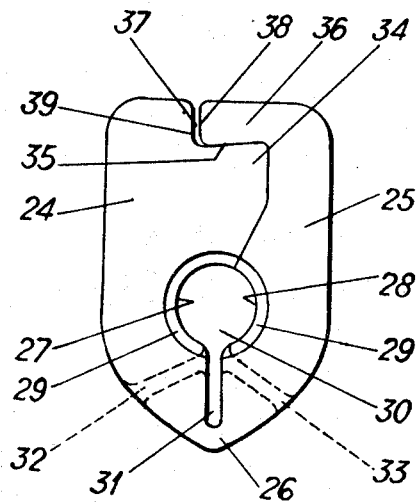
FIG. 4 is an end elevation of a clip in accordance with a second embodiment of the invention.

In the preferred embodiment shown in FIGS. 1, 2 and 3, a clip for fastening a snood to a mainline comprises two arms 1 and 2 made of a firm flexible plastic material such as polyethylene, polypropylene, acetal resin, nylon, polyvinyl chloride or co-polymers, the two arms 1 and 2 being integrally molded with one another and having a slender portion 3 of plastic material serving as a hinge about which the arms 1 and 2 may be pivoted away from each other.

Opposed faces of the arms 1 and 2 are provided with part-circular rebates 4 and 5 having bevelled edges 6 and 7, which rebates together define a circular aperture 8 when the two arms are snap-fastened together.

The clip is adapted to be snap-fastened on a bobbin 9 molded onto a main line 10, the bobbin 9 having a central comparatively small diameter section portion 11 and frusto-conical end portions 12 providing shoulders 13 adjacent the central portion to prevent a clip carried by the latter from moving longitudinally.

The central portion 11 of the bobbin 9 is so dimensioned that the clip may be rotated with respect to it when in its snap-fastened position.

Two holes 14 and 15 are molded or drilled through the portions of the arms adjacent to the hinge and extend perpendicularly to the axis of the aperture 8 to allow one end portion of a snood 16 carrying a hook 17 (shown in dot and dash lines)—or alternatively, if desired, a lure, trap, pot or the like—to be threaded through the holes for attaching the snood 16 to the clip.

The two arms 1 and 2 have their end portions remote from the hinge shaped to be snap-fastened to one another. For this purpose, the arm 2 is provided with a nose 18 which projects towards the arm 1 and presents a shouldered surface 19 directed away from the hinge. The arm 1 is shaped to fit around the nose and is formed with a limb 20 which snaps over the shouldered surface 19 of the nose 18 when the two arms 1 and 2 are pressed together. A narrow gap 21 is left between the end 22 of the snapped-over arm 1 and the opposed part 23 of the arm 2 to enable a solid object, such as a metal strip, to be inserted between the arms 1 and 2 in order to pry them apart and allow the clip to be removed from the main line.

Prior to the shooting operation in fishing, the hooks on the snoods are baited and the clips with attached snoods are stowed separately from the main line. When the main line is shot, the clips are fed on to it at spaced positions along its length and are snaped shut around the bobbins (which in practice may be fastened to the main line as shown in FIG. 2 or integral with it, or the clips may be snapped shut around the main line between pairs of knots). The clip attaches the snood to the main line during fishing. During recovery of the line the clips may be automatically detached from the main line by suitable equipment and stowed with their catch separately.

In the second embodiment (see FIG. 4), a clip for fastening a snood to a main line comprises two flattened arms 24 and 25 made of a firm flexible plastic material as in the case of the first embodiment. The two arms are integrally molded with one another and with a strip portion 26 at one pair of ends which provides a hinge. The two arms are provided in their opposed faces with part-circular rebates 27 and 28 having bevelled edges 29, which rebates together define a circular aperture 30 when the two arms are snap-fastened together. The main or long line (not shown) passes through the aperture 30 and the portions of the two arms between the aperture and the hinge are slightly spaced from one another at 31. Two holes 32 and 33 are molded or drilled through the portions of the arms adjacent to the hinge and extend perpendicularly to the axis of the aperture 30 to allow one end portion of a snood (not shown) to be threaded through the holes for attaching the snood to the clip.

The two arms 24 and 25 have their end portions remote from the hinge shaped to be snap-fastened to one another. For this purpose, the arm 24 is provided with a nose 34 which projects towards the arm 25 and presents a shouldered surface 35 directed away from the hinge. The arm 25 is shaped to fit around the nose 24 and is formed with a limb 36 which snaps over the shouldered surface 35 of the nose 34 when the two arms are pressed together. A narrow gap 37 is left between the end 38 of the snapped-over arm and the opposed part 39 of the other arm to enable a solid object such as a metal strip to be inserted between the two arms in order to pry them apart and allow the clip to be removed from the main line.

In all the clips described, the side surfaces of the clip may be suitably shaped to facilitate manual or automatic attachment or detachment of the clip from the main line. The circular opening in the closed clip through which the main line passes allows the clip to revolve around the line axis to reduce the risk of the snood tangling the main line.

I claim:
1. A detachable clip for connection to a line or the like, comprising a unitary member having a pair of arms integrally hinged together and extending arcuately outward from said hinge, the arms having free ends terminating in mating surfaces providing a central aperture adapted to encircle said line, said hinge being of reduced size to permit said arms to be pulled apart in a generally radial direction, the surface of the free end of one of said arms being formed with a nose and a shouldered surface on said nose, the surface of the free end of the other arm being formed with a limb adapted to mate with said nose and snap fasten over said shouldered surface and means adjacent said hinge for attaching a second line thereto.

2. The clip according to claim 1, wherein said arms are disposed in a common plane and the mating shouldered surface and limb surface are disposed transverely thereto.

3. The clip according to claim 2, wherein the adjacent peripheral portions of the free ends of said arms are spaced from each other to provide a gap therebetween for facilitating the prying apart of said arms.

4. The clip according to claim 3, wherein said member is made of plastic material.

5. In combination, a main line; a detachable clip for connecting a second line thereto, said clip comprising a unitary member having a pair of arms integrally hinged together, said arms extending arcuately outward from said hinge, said arms having free ends terminating in mating surfaces and an inner central aperture of greater diameter than said main line so that said clip may freely encircle the same, said hinge portion being reduced in size relative to said arms to permit said arms to be pulled apart in a generally radial direction, one of said mating surfaces being formed with a nose having a shouldered surface, the other one of said mating surfaces being formed with a limb adapted to snap fasten over said shouldered surface, means adjacent said hinge for securing the second line thereto; and limiting means secured to said main line for preventing movement of said clip therealong.

6. The combination according to claim 5, wherein said arms are disposed in a common plane and the mating shouldered surface and limb surface are disposed transversely thereto.

7. The combination according to claim 6, wherein the adjacent peripheral portions of the free ends of said arms are spaced from each other to provide a gap therebetween for facilitating the prying apart of said arms.

8. The combination according to claim 7, wherein said member is made of plastic material.

9. The combination according to claim 5, wherein said limiting means comprises a bobbin secured to said main line, said bobbin including spaced radial flanges between which the clip is located.

References Cited

UNITED STATES PATENTS

| | | | |
|---|---|---|---|
| 1,905,449 | 4/1933 | Dunn | 43—44.85 |
| 2,685,193 | 8/1954 | Marymont | 24—237 X |
| 3,111,734 | 11/1963 | Pachner | 24—237 X |
| 3,435,552 | 4/1969 | Caldwell | 43—43.15 |

FOREIGN PATENTS

| | | |
|---|---|---|
| 1,463,606 | 11/1966 | France. |
| 1,074,921 | 2/1960 | Germany. |

SAMUEL KOREN, Primary Examiner

D. J. LEACH, Assistant Examiner

U.S. Cl. X.R.

24—114.5, 123, 129, 237, 242